US006751458B1

(12) United States Patent
Wang et al.

(10) Patent No.: US 6,751,458 B1
(45) Date of Patent: Jun. 15, 2004

(54) ARCHITECTURE UTILIZING FREQUENCY REUSE IN ACCOMMODATING USER-LINK AND FEEDER-LINK TRANSMISSIONS

(75) Inventors: Weizheng Wang, Rancho Palos Verdes, CA (US); Donald C. D. Chang, Thousand Oaks, CA (US); Ming U. Chang, Rancho Palos Verdes, CA (US); Ying Feria, Manhattan Beach, CA (US); Alan Cha, Glendale, CA (US)

(73) Assignee: The Directv Group, Inc., El Segundo, CA (US)

( * ) Notice: Subject to any disclaimer, the term of this patent is extended or adjusted under 35 U.S.C. 154(b) by 455 days.

(21) Appl. No.: 09/612,465

(22) Filed: Jul. 7, 2000

(51) Int. Cl.[7] .................................................. H04Q 7/20

(52) U.S. Cl. ....................... 455/427; 455/447; 455/443; 455/12.1

(58) Field of Search ............................... 455/3.02, 12.1, 455/3.05, 427, 428, 429, 430, 443, 444, 446, 447, 448, 449, 452, 453, 452.1, 452.2, 13.2

(56) References Cited

U.S. PATENT DOCUMENTS

| | | |
|---|---|---|
| 4,819,227 A | 4/1989 | Rosen |
| 5,077,562 A | 12/1991 | Chang et al. |
| 5,555,257 A | 9/1996 | Dent |
| 5,572,216 A | 11/1996 | Weinberg et al. |
| 5,594,941 A | 1/1997 | Dent |
| 5,612,701 A | 3/1997 | Diekelman |
| 5,790,070 A | 8/1998 | Natarajan et al. |
| 5,839,053 A | 11/1998 | Bosch et al. |
| 5,856,804 A | 1/1999 | Turcotte et al. |
| 5,903,549 A | 5/1999 | Von der Embse et al. |
| 5,949,766 A | 9/1999 | Ibanez-Meier et al. |
| 5,974,317 A | 10/1999 | Djuknic et al. |
| 6,018,316 A | 1/2000 | Rudish et al. |
| 6,020,845 A | 2/2000 | Weinberg et al. |
| 6,061,562 A | 5/2000 | Martin et al. |
| 6,111,542 A | 8/2000 | Day et al. |

(List continued on next page.)

FOREIGN PATENT DOCUMENTS

| | | |
|---|---|---|
| EP | 0 549 220 A | 6/1993 |
| EP | 0 845 874 A2 | 6/1998 |
| GB | 2 349 045 A | 10/2000 |
| WO | WO 90/13186 | 11/1990 |
| WO | WO 96 31016 A | 10/1996 |
| WO | WO 97/07609 | 2/1997 |
| WO | WO 98/51568 | 11/1998 |
| WO | WO 99 13598 A | 3/1999 |
| WO | WO 99 23769 A | 5/1999 |

OTHER PUBLICATIONS

Colella, Nocholas J. et al., "High–Speed Internet Access via Stratospheric HALO Aircraft", INET'99 Proceedings, http://www.isoc.org/conferences/inet/99/proceedings/index.htm, 4. Technology, Wireless, Jun. 8, 1999.

(List continued on next page.)

*Primary Examiner*—Nay Maung
*Assistant Examiner*—Edan Orgad
(74) *Attorney, Agent, or Firm*—Georgann S. Grunebach; John A. Crook, III

(57) ABSTRACT

A communication system has a high altitude communication device generating a plurality of user link beams having a first communication characteristic and a feeder link having a first communication characteristic. A gateway terminal receives the user link beam. A user terminal receives at least one of the user link beams. The plurality of user link beams comprises a first user link beam within a first cell and a first isolation zone outside the first cell. The plurality of user link beams comprises a second user link beam having the first communication characteristic and positioned within a second cell and a second isolation zone outside said second cell. The second isolation zone overlaps the first isolation zone. The feeder link is positioned within the first isolation zone and the second isolation zone. The feeder link has the first communication characteristic.

21 Claims, 4 Drawing Sheets

10
30
18
26
26
28
20
16
16
16
14
12
16
24
Terrestrial Networks
22

U.S. PATENT DOCUMENTS

| | | | | | |
|---|---|---|---|---|---|
| 6,138,012 | A | | 10/2000 | Krutz et al. | |
| 6,147,658 | A | | 11/2000 | Higashi et al. | |
| 6,151,308 | A | | 11/2000 | Ibanez-Meier et al. | |
| 6,167,263 | A | | 12/2000 | Campbell | |
| 6,173,178 | B1 | | 1/2001 | Hammill et al. | |
| 6,205,320 | B1 | | 3/2001 | Coleman | |
| 6,208,626 | B1 | * | 3/2001 | Brewer | 370/310 |
| 6,215,776 | B1 | * | 4/2001 | Chao | 370/316 |
| 6,236,834 | B1 | | 5/2001 | Poskett et al. | |
| 6,317,420 | B1 | * | 11/2001 | Schiff | 370/325 |
| 6,324,398 | B1 | | 11/2001 | Lanzerotti et al. | |
| 6,388,615 | B1 | | 5/2002 | Chang et al. | |
| 2002/0006795 | A1 | | 1/2002 | Norin et al. | |

OTHER PUBLICATIONS

U.S. patent application Ser. No. 09/718,973, Wang et al., filed Nov. 21, 2000.

Colella N J et al., "The HALO Network ™", IEEE Communications Magazine, IEEE Service Center, Piscataway, N.J. U.S., vol. 38, No. 6, Jun. 2000, pp. 142–148, XP 000932657, ISSN: 0163–6804.

U.S. patent application Ser. No. 09/594,375, Chang et al., filed Jun. 15, 2000.

U.S. patent application Ser. No. 09/594,374, Chang et al., filed Jun. 15, 2000.

U.S. patent application Ser. No. 09/649,355, Hagen et al., filed Aug. 28, 2000.

K. K. Chan, et al., "A Circularly Polarized Waveguide Array for Leo Satellite Communications", Antennas and Propagation Society, 1999, IEEE International Symposium, vol. 1 Jul. 11–16, 1999, pp. 154–157.

M. Oodo, et al, "Onboard DBF Antenna for Stratospheric Platform", 2000 IEEE International Conference on Phased Array Systems and Technology, Proceedings, May 21–25, 2000, pp. 125–128.

R. Suzuki et al., "Mobile TDM/IDMA System with Active Array Antenna", Global Telecommunications Conference, 1991, GLOBECOM '91; Dec. 2–5, 1991; pp. 1569–1573, vol. 3.

* cited by examiner

Terrestrial Networks

ARCHITECTURE UTILIZING FREQUENCY REUSE IN ACCOMMODATING USER-LINK AND FEEDER-LINK TRANSMISSIONS

TECHNICAL FIELD

The present invention relates generally to communications systems, and more particularly, to a spectrum allocation for communication systems.

BACKGROUND ART

In this communication age, content providers are increasingly investigating ways in which to provide more content to users as well as interfacing with a larger group of users. The latest communications systems use digital broadcast satellites to broadcast to users in a forward direction. System operators have recognized that user requests are relatively small in terms of data compared to the amount of data broadcast from the satellite. Thus, for example, in the DirecTV® system, user requests are transmitted through telephone lines and programming is provided to the users via satellite.

In addition to satellites, stratospheric platforms are currently under development. One such stratospheric platform is Helios that is being developed by AeroVironment. The Helios stratospheric platform is an unmanned vehicle that can fly for several months at a height of about 60,000 feet. Helios is a solar powered electric plane that is modular in design and may be configured to carry a variety of payloads. Stratospheric platforms have numerous advantages over geo-stationary satellites, including that a large bandwidth density can be projected over a small but populated area, associated transmission delays are significantly reduced, the power required for transmitting and receiving is substantially smaller, and the user elevation are higher in general. Also, these stratospheric platforms can be deployed relatively rapidly compared to satellites and thus, if a business need increases, the system capability may be increased quickly through deploying new platforms.

Commonly, such communication systems have a high altitude communications device such as a satellite or a stratospheric platform as described above. Also, such systems have user terminals and a gateway station or plurality of gateway stations that communicate with the high altitude communications device and link the user terminals to terrestrial networks.

Because the frequency resources are scarce for over-air transmissions, various multiplexing schemes are used to provide a greater number of communication signals within an allocated communication ban. Such schemes include code division multiple access ("CDMA"), time division multiple access ("TDMA"), frequency division multiple access ("FDMA"), or combinations of these schemes. Typically, the user links between the high altitude device and user terminals operate at different frequencies, times or codes than those of the feeder link to prevent interference. However, because frequency resources are scarce, it would be desirable to provide a system that utilizes the same communication frequency spectrum of the user links in the feeder link.

It would therefore be desirable to provide a communication system that efficiently uses the available spectrum for both feeder and user links simultaneously.

SUMMARY OF THE INVENTION

It is an object of the invention to provide a communication system in which the feeder link does not require extra communications frequency spectrum from those of the fixed user links.

In one aspect of the invention, a communication system has a high altitude communication device generating a plurality of user link beams having a first communication characteristic and a feeder link having a first communication characteristic. A gateway terminal, with higher gain and narrower beam-width receives not the user link but a feeder link beam with a much higher data throughput rate than those from a user link. A user terminal receives at least one of the user link beams. The communications system features a "spoke-and-hub" (S-&-H) architecture. Connectivity among users is established not directly but through a central hub. A platform may be connected to various users via different user link beams and codes. But there is no cross-beam nor cross-code connectivity on board the platform. The platform pipes all the user signals back to a ground hub through a high data rate feeder link. The connectivity among user signals is achieved through switching and/or routing mechanisms on ground. The plurality of user link beams comprises a first user link beam associated a first cell and a first isolation zone outside said first cell. The plurality of user link beams comprises a second user link beam having the first communication characteristic and positioned within a second cell and a second isolation zone outside said second cell. The second isolation zone overlaps the first isolation zone. The feeder link is positioned within the first isolation zone and the second isolation zone. The feeder link has the first communication characteristic.

In a further aspect of the invention, a method of operating communication system comprises the steps of:

generating a first user link beam having a first communication characteristic and a first cell zone and a first isolation zone;

generating a second user link beam having a first communication characteristic and a second cell zone and a second isolation zone at least partially overlapping said first isolation zone;

generating a feeder link beam having the first communication characteristic and positioned within said first isolation zone and said second isolation zone.

One advantage of the invention is that the user link transmission antenna and the feeder link transmission antenna are decoupled to allow independent optimizations on the platform use link and feeder link antenna designs.

Other objects and features of the present invention will become apparent when viewed in light of the detailed description of the preferred embodiment when taken in conjunction with the attached drawings and appended claims.

BEST MODES FOR CARRYING OUT THE INVENTION

Figure 1:
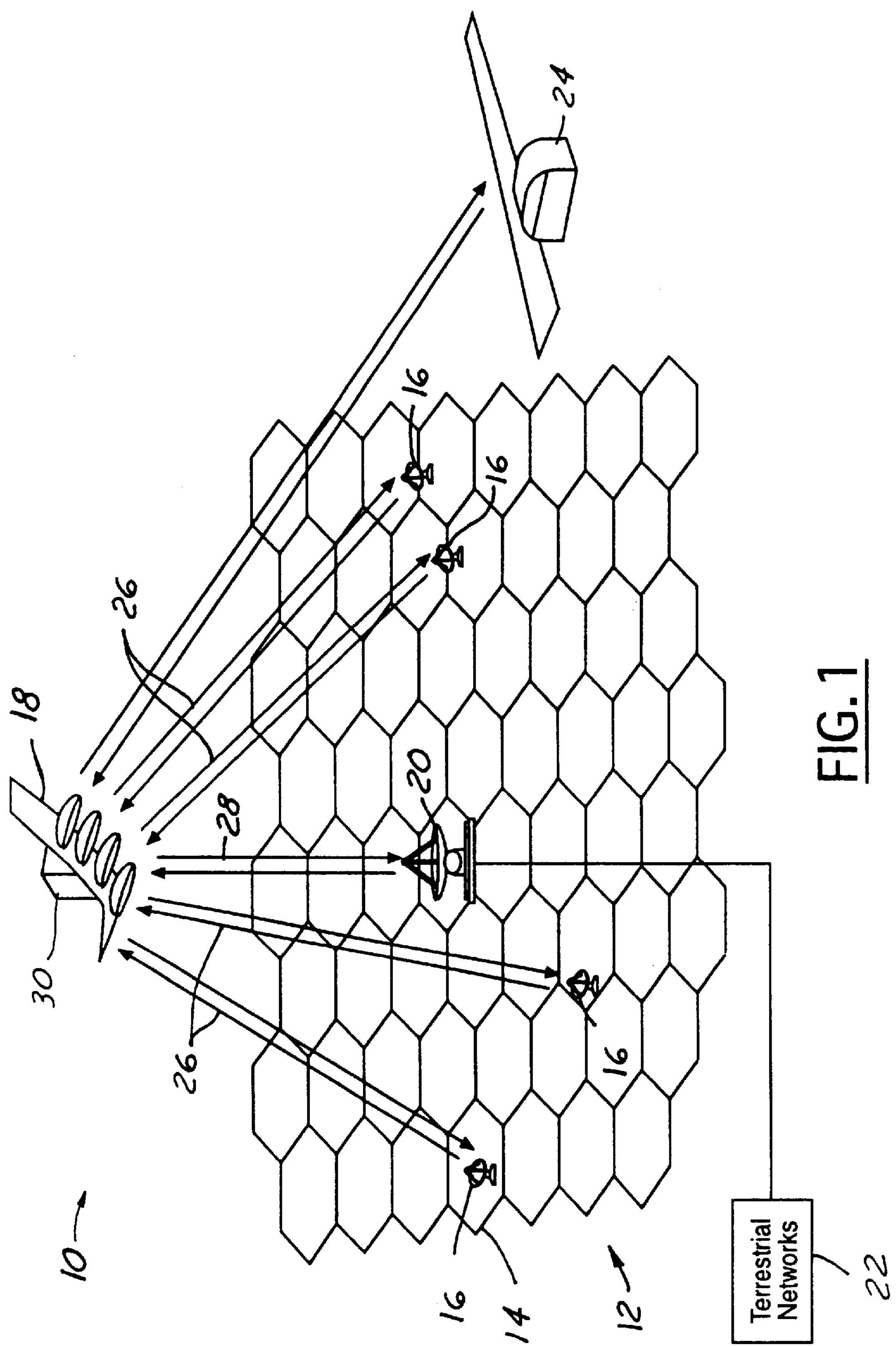
FIG. 1 is a system level view of the communication system, according to the present invention.

In the following description, the same reference numerals are used to identify the same components in the various views. Those skilled in the art will recognize that various other embodiments, structural changes and changes in exemplary measures may be made without departing from the scope of the invention. The following examples use transmitted beams, however, those skilled in the art will recognize the antenna gain patterns work for both transmit and receive mode.

Referring now to FIG. 1, a communications system 10 has a cell pattern 12 that is illustrated as a plurality of hexagons on the earth's surface. The hexagons represent the footprint of a radiated beam onto the earth's surface. These are otherwise known as cells 14. Each cell 14 represents a geographic area that can receive signals from the stratospheric platform with a pre-determined signal strength. A plurality of user terminals 16 are used to illustrate fixed users. Each user terminal 16 may receive a signal with the predetermined signal strength within a spot beam in a multiple spot beam pattern radiated from a communications payload of the high altitude communication device 18.

Communication system 10 further includes a gateway station 20 that is coupled to terrestrial networks 22. Communication system may also include a device operations center 24. Both gateway station 20 and device operations center 24 are in communication with high altitude communication device 18. Gateway station 20 provides connectivity between user terminals 16 and terrestrial networks 22 through high altitude communications device 18. Device operation center 24 provides command and control functions to communications device 18. Although illustrated as two separate units, gateway station 20 and device operation center 24 may be combined into the same physical location.

The communication signals between high altitude communication device 18 and user terminals 16 may be referred to as user links 26. User links 26 represent the transmit and receive beams from user device 16 and high altitude communications device 18. A feeder link 28 is defined between high altitude communications device 18 and gateway station 20.

High altitude communications device 18 such as those under development by AeroVironment, Helios, is an unmanned vehicle that can fly for several months at an altitude of about 60,000 feet above the earth. Helios is a solar-powered, electric plane that is modular in design and may be configured in a variety of ways. The stratospheric platform is operated through the device operations center 24 to fly in a small radius flight path over a given spot on the earth.

High altitude communications device 18 is used as a communication node for gateway station 20 and user terminals 16, each of which has a medium gain antenna with a small beam-width that is pointed at the direction of the high altitude communications device 18. Although only one gateway station 20 is illustrated in the figure, those skilled in the art would recognize that various numbers of gateway stations may be employed as is described below in FIG. 6. As will be further described below, gateway station 20 has a high gain antenna with very small beam width that may need a tracking mechanism to maintain a communication link with high altitude communication device 18 throughout the flight path. These antennas may be electronically or mechanically steered.

High altitude communication device 18 has a payload 30 that is used to connect user terminals 16 and gateway station 20. In the present example, the payload 30 is used to generate a plurality of beams in a frequency division multiple access system. However, those skilled in the art would recognize that the present invention is equally applicable to a code division multiple access system. Various number of users may communicate within a beam.

Figure 2:
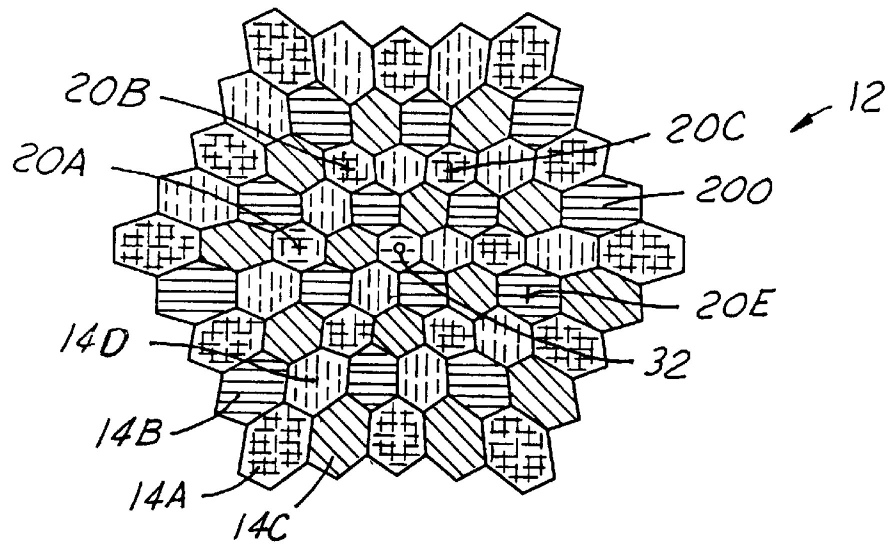
FIG. 2 is reuse plot of a cell coverage map illustrating cells with various communication characteristics.

Referring now to FIG. 2, a plan view of a cell reuse pattern 12 is illustrated having cells 14. FIG. 2 illustrates a FDMA system with four different frequencies illustrated as four differently cross-hatched areas. This is called a four-beam frequency reuse pattern. Those skilled in the art will recognize that various numbers of frequencies may be used, such as three-beam or 7 beam frequency reused pattern. As illustrated the entire frequency spectrum is subdivided into 4 frequency bands, cells 14A have one frequency band, cells 14B have a second frequency band, cells 14C have a third frequency band, and cells 14D have a fourth frequency band. Each cell belongs to one of either 14A, 14B, 14C or 14D as symbolized by the different cross-hatching. As mentioned above, this invention applies equally to code in place of frequency band. A plurality of gateway stations 20A, 20B, 20C, 20D and 20E are illustrated. High altitude communication device 18 is located above the cell 32.

Figure 3:
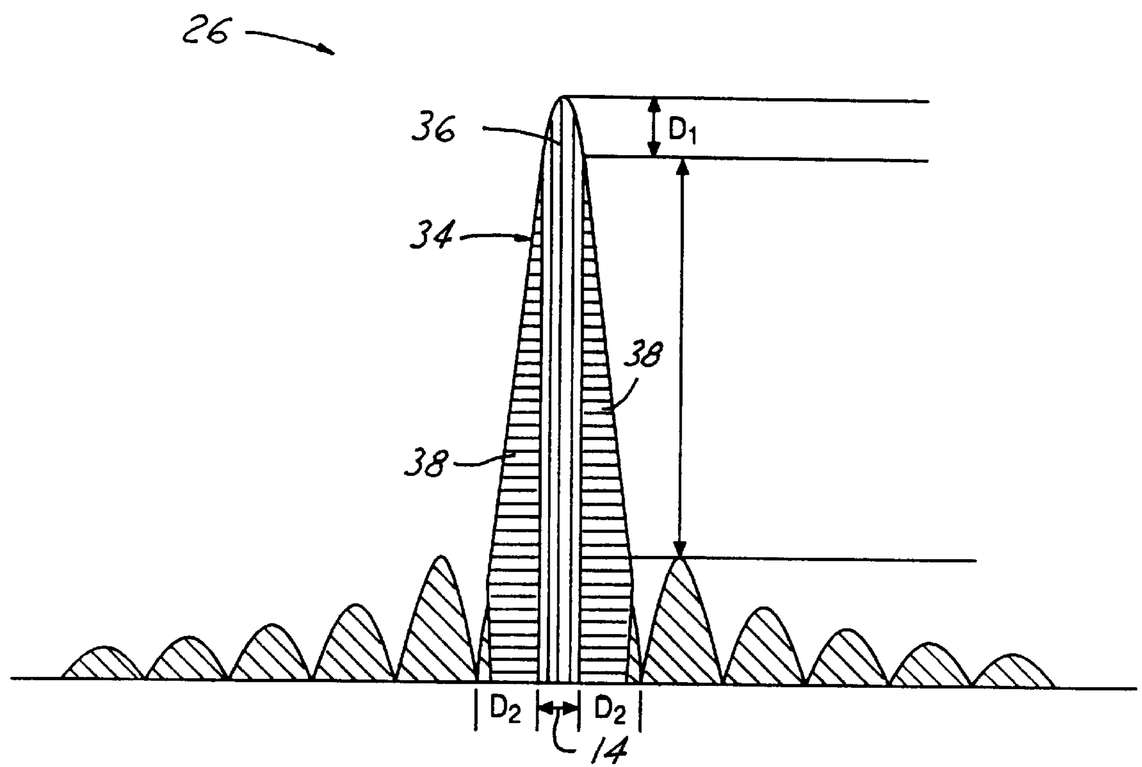
FIG. 3 is a view of a communication beam gain pattern according to the present invention.

Referring now to FIG. 3, certain antenna restrictions apply to user terminal antennas, gateway antennas, and platform antennas to enable frequency reuse. A one dimensional example is illustrated. The restrictions are for both transmitting and receiving. A typical antenna radiation beam pattern 34 is illustrated in FIG. 3. Beam pattern 34 has a center portion 36 that corresponds to the gain within the width of a cell 14. There will be a predetermined power flux density within the center portion 36. The height $D_1$ is referred to as the cell center to edge ratio. In a two-dimensional contour pattern (not shown), the central cell will feature a circular shape. The overlapped area is simplified among adjacent beams to make the cell shape hexagonal. The area just outside the center portion 36 is the isolation zone 38. Isolation zone 38 extends a predetermined distance outside the cell 14. The isolation zone 38 is the area that extends the distance $D_2$ from cell 14. There is an acceptable minimum distance for reusing the same frequency in another location while controlling interference and maintaining an acceptable signal to noise ratio. When the cell center to edge ratio D1 is reasonably small, all users in the cell 14 have almost the same receipt power or the transmission quality. The neighboring cell has the power flux density steadily decreasing through the isolation zone 38. Quality reception in the isolation zone and the neighboring cell cannot be insured so that frequency reuse can be performed.

Together the isolation zone 38 and center portion 36 form the main lobe. Various other lobes 40 with reduced gains are illustrated. The gain of the side lobes 40 is designed to be about −20 to −30 dB in general; small enough to not interfere with beams using the same frequency.

Figure 4:
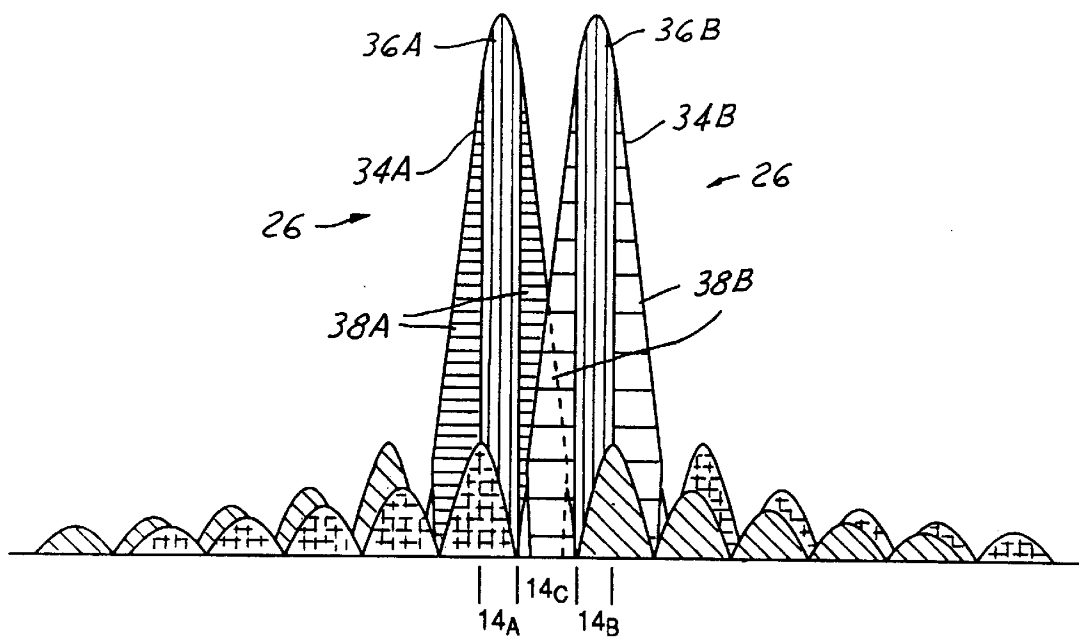
FIG. 4 is a view of two beam gain patterns of adjacent beams having overlapping isolation zones according to the present invention.

Referring now to FIG. 4, three cells 14A, 14B and 14C are illustrated in a one-dimensional antenna pattern. These three cells are on a same plane as illustrated in FIG. 2. They are a part of the beam pattern in a triangular lattice. Also depicted in FIG. 4, a first center portion 36A of a beam pattern 34A and a second center portion 36B of a second beam pattern 34B are illustrated. The beam patterns 34A and 34B have the same communication characteristic (in this example frequency and code). Cells 14A and 14B are separated from each other by an angular distance that equals to a cell 14C. Thus, signal strengths intended for users in 14B and 14A must decrease sufficiently in the isolation zones so that the frequency may be reused with the spacing of only one cell there between. Consequently, isolation zones 38A and 38B overlap.

Figure 5:
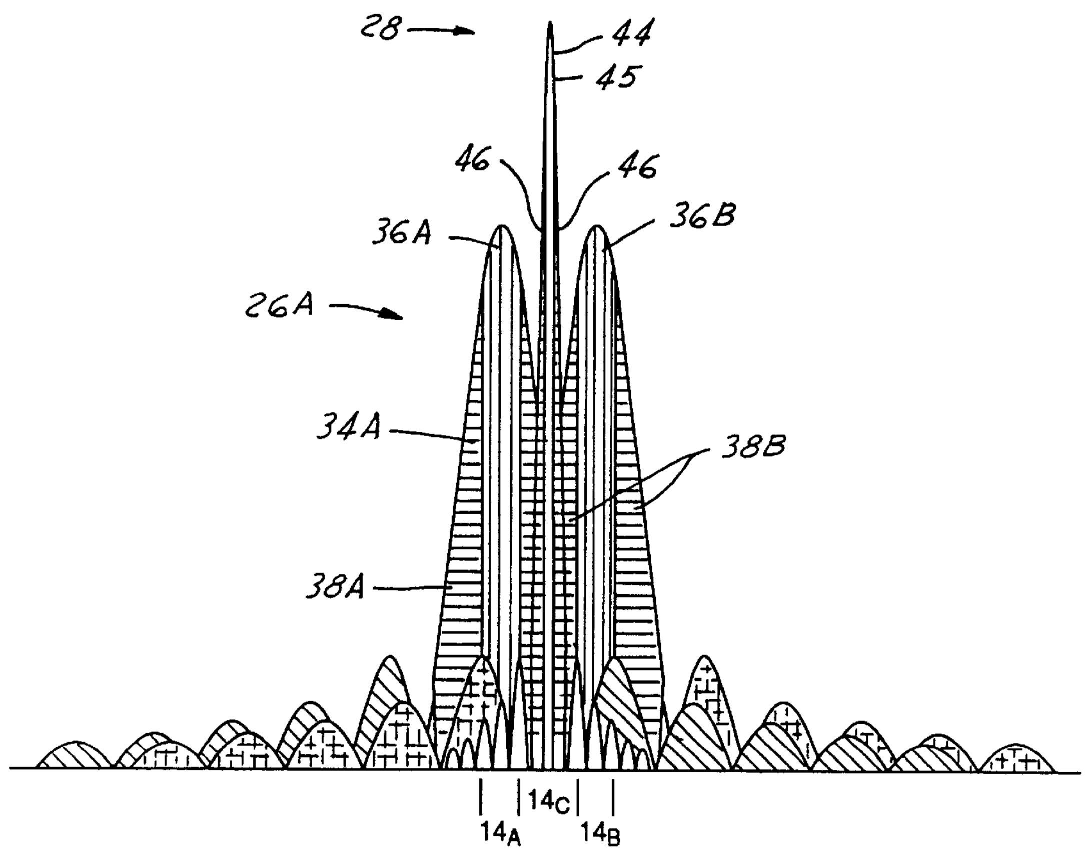
FIG. 5 is a view of the gain pattern of two user links and a feeder link according to the present invention.

Referring now to FIG. 5, a feeder link beam 44 is illustrated having a center portion 45 and an isolation portion 46. Feeder link beam 44 has the same communication characteristics such as frequency but has a higher gain and a narrower beam-width than those for user beams as indicated by the center portions 36A and 36B. Preferably, feeder link 44 is located between center portions 36A and 36B. Also, the isolation portion 46 preferably does not extend beyond the cell 14C. That is, the isolation portion 46 is coextensive or overlaps the isolation zones 38A and 38B. By providing the narrowly tailored feeder link beam 44 in a directly adjacent cell 14C to cells 14A, 14B, the same communication characteristics such as frequency may be reused. The one-dimensional pattern is somewhat misleading. There are actually one more dimension in and out of the paper, which provides additional angular distance and more isolation. In general the second dimension can provide ~40% more angular separation and 10 dB additional isolation. Thus, in this configuration, the feeder link 44 may use the same frequency spectrum of the user link 26. Thus, the frequency spectrum for the communication system 10 is efficiently utilized not only used and reused by user links but also by feeder links. Because the gateway antenna allows the feeder link 28 to operate at a higher gain, very minimum interference of the adjacent user beams is obtained from the isolation zones 38A, 38B.

Figure 6:
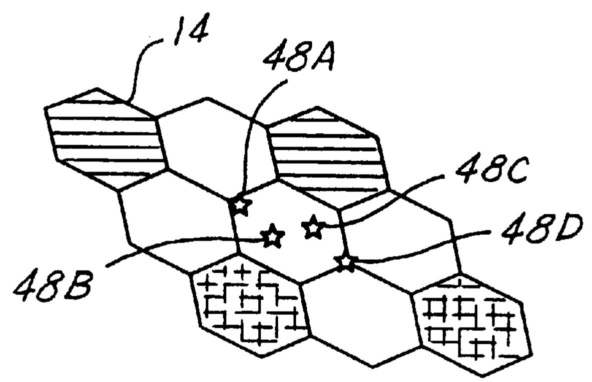
FIG. 6 is a partial cell pattern illustrating a plurality of gateway stations in a single cell.

Referring now to FIG. 6, a portion of a cell pattern 12 is illustrated. Having various cells 14. In this example, four gateway stations 48A, 48B, 48C and 48D are positioned in a single cell. These 4 isolated beams are spaced at least 2 beam-widths away from each other. Furthermore there are interference cancellation techniques to assure adequate isolation among the 4 beams. Each of the gateway stations 48A through 48D use the same frequency spectrum. This is possible because the gateway stations 48A through 48D have a higher gain and little or no interference is achieved between adjacent gateway stations 48A through 48D. For example, the feeder link antenna aperture is four to five times as large in radius as the user link antenna aperture, the feeder link antenna gain is 12 to 14 dB more than the user link antenna gain. The beam width for the feeder link is at least four to five times narrower than the beam width of the user link. If traffic is uniformly distributed, a gateway station can use 75% of the total band for its feeder link transmission. For a seven frequency reuse pattern, a gateway station can use about 85% of the total band width. Preferably, gateway stations should be located in cells with relatively less traffic such that the user-link frequency band width is less than average.

Figure 7:
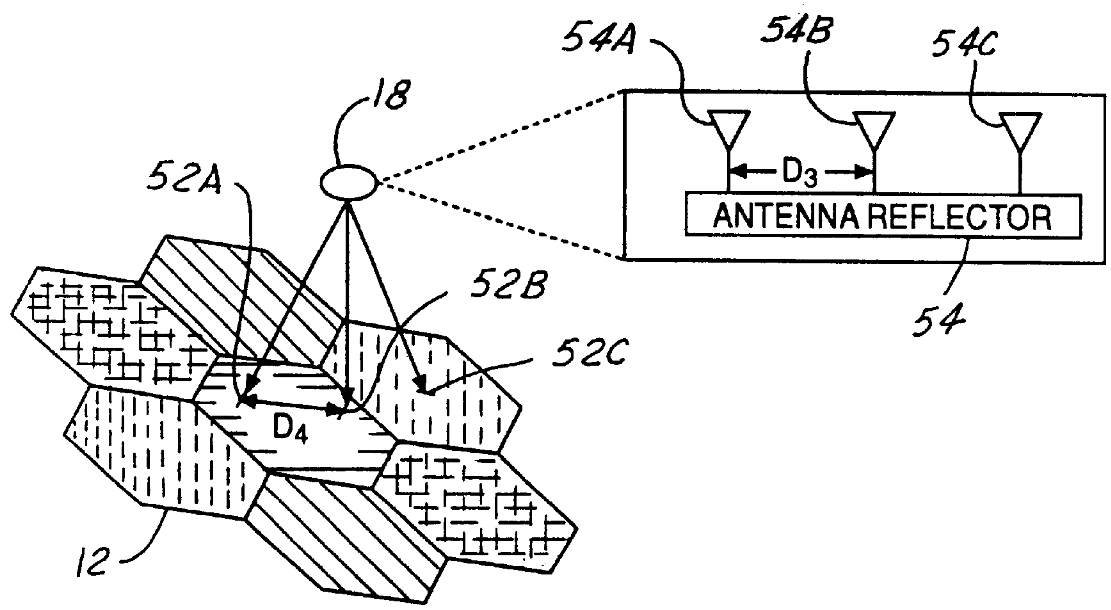
FIG. 7 is a schematic view of a multiple beam antenna system wherein multiple beams from a single platform are connected by multiple gateway stations.

Thus, more frequency resources may be used for the feeder link transmission. Referring now to FIG. 7, a cell pattern 12 is illustrated with three gateway stations 52A, 52B and 52C. As illustrated, gateway stations 52A, 52B are positioned in the same cell while station 52C is in the adjacent cell. 52A & 52B can use the same portion of the frequency spectrum and 52C could use a different portion of the spectrum. A high altitude communication device 18 is illustrated having an antenna reflector 54 with multiple feed horns 54A, 54B and 54C. Each feed horn 54A through 54C may service different gateway stations 52A through 52C. That is, feed horns 54A through 54C preferably serve a respective gateway station 52A through 52C. Thus, by using a single reflector with multiple feed horns, the size of the payload and thus the cost of the satellite are reduced. As illustrated, the feed horns are spaced properly so that the "images of the feeds" (or beams) illuminate the corresponding gateway stations. Those who understand antenna technology will realize the art of multi-beam antenna using reflectors. The positions among the feed horns and the reflector focus determines the relevant directions and distance of the two gateway stations on the ground. If n gateway stations are needed for the platform system, then the platform antenna should have n feed horns.

While particular embodiments of the invention have been shown and described, numerous variations will occur to those skilled in the art. Accordingly, it is intended that the invention be limited only in terms of the appended claims.

What is claimed is:

1. A communication system comprising:

a high altitude communication device generating a plurality of user link beams having a first communication characteristic and a feeder link beam having the first communication characteristic;

a gateway terminal receiving the feeder link beam;

a user terminal receiving at least one of said user link beams;

wherein said plurality of user link beams comprises a first user link beam within a first cell and a first isolation zone outside said first cell, and a second user link beam having a second isolation zone overlapping said first isolation zone, said feeder link positioned within said first isolation zone and said second isolation zone.

2. A communication system as recited in claim 1 wherein said first communication characteristics comprises a code.

3. A communication system as recited in claim 1 wherein said first communication characteristic comprises a frequency.

4. A communication system as recited in claim 1 wherein said high altitude communication device comprises a stratospheric platform.

5. A communication system as recited in claim 1 wherein said high altitude communication device comprises a satellite.

6. A communication system as recited in claim 1 wherein said feeder link has a third isolation zone within said first isolation zone and said second isolation zone.

7. A communication system as recited in claim 1 further comprising of plurality of gateway terminals, said high altitude communication device comprises a reflector having a plurality of feed horns corresponding to a respective one of the plurality of gateway terminals.

8. A communication system as recited in claim 1 wherein said gateway terminal is coupled to a terrestrial network.

9. A method of operating a communication system comprises the steps of:

generating a first user link beam having a first communication characteristic and a first isolation zone;

generating a second user link beam having the first communication characteristic and a second isolation zone at least partially overlapping said first isolation zone; and, generating a first feeder link beam having said first communication characteristic and positioned within said first isolation zone and said second isolation zone.

10. A method as recited in claim 9 further comprising the steps of generating a third user link having the first communication characteristic and a third isolation zone at least partially overlapping said second isolation zone; and, generating a second feeder link beam having the first communication characteristic and positioned within the second and third isolation zone.

11. A method as recited in claim 9 wherein the first communication characteristic comprises a code.

12. A method as recited in claim 9 wherein the first communication characteristic comprises a frequency.

13. A communication system having a first cell, a second cell and a third cell comprising:

a high altitude communication device generating a first user link beam having a first communication characteristic having a first center portion located within first cell and a first isolation zone located within the second cell, a second user link beam having the first communication characteristic having a second center portion located within a third cell and a second isolation zone located within the second cell and a first feeder link beam having the first communication characteristic located within the second cell.

14. A communication system as recited in claim 13 wherein said high altitude communication device comprises a stratospheric platform.

15. A communication system as recited in claim 13 wherein said high altitude communication device comprises a satellite.

16. A communication system as recited in claim 13 wherein said first communication characteristic comprises a code.

17. A communication system as recited in claim 13 wherein said first characteristic comprises a frequency.

18. A communication system as recited in claim 13 wherein said first feeder link beam has a third isolation zone within the second cell.

19. A communication system as recited in claim 13 wherein said first feeder link has a power greater than the first user link and the second user link.

20. A communication system as recited in claim 13 further comprising a second feeder link beam having the first communication characteristic located within the second cell.

21. A communication system as recited in claim 20 wherein said high altitude device comprises a reflector having a plurality of feed horns corresponding to said first feeder link coupled to said reflector and said second feeder link coupled to said reflector.

* * * * *